Feb. 17, 1942.　　　J. LUX　　　2,273,410
DRAW BAR
Filed July 11, 1941　　　4 Sheets-Sheet 1
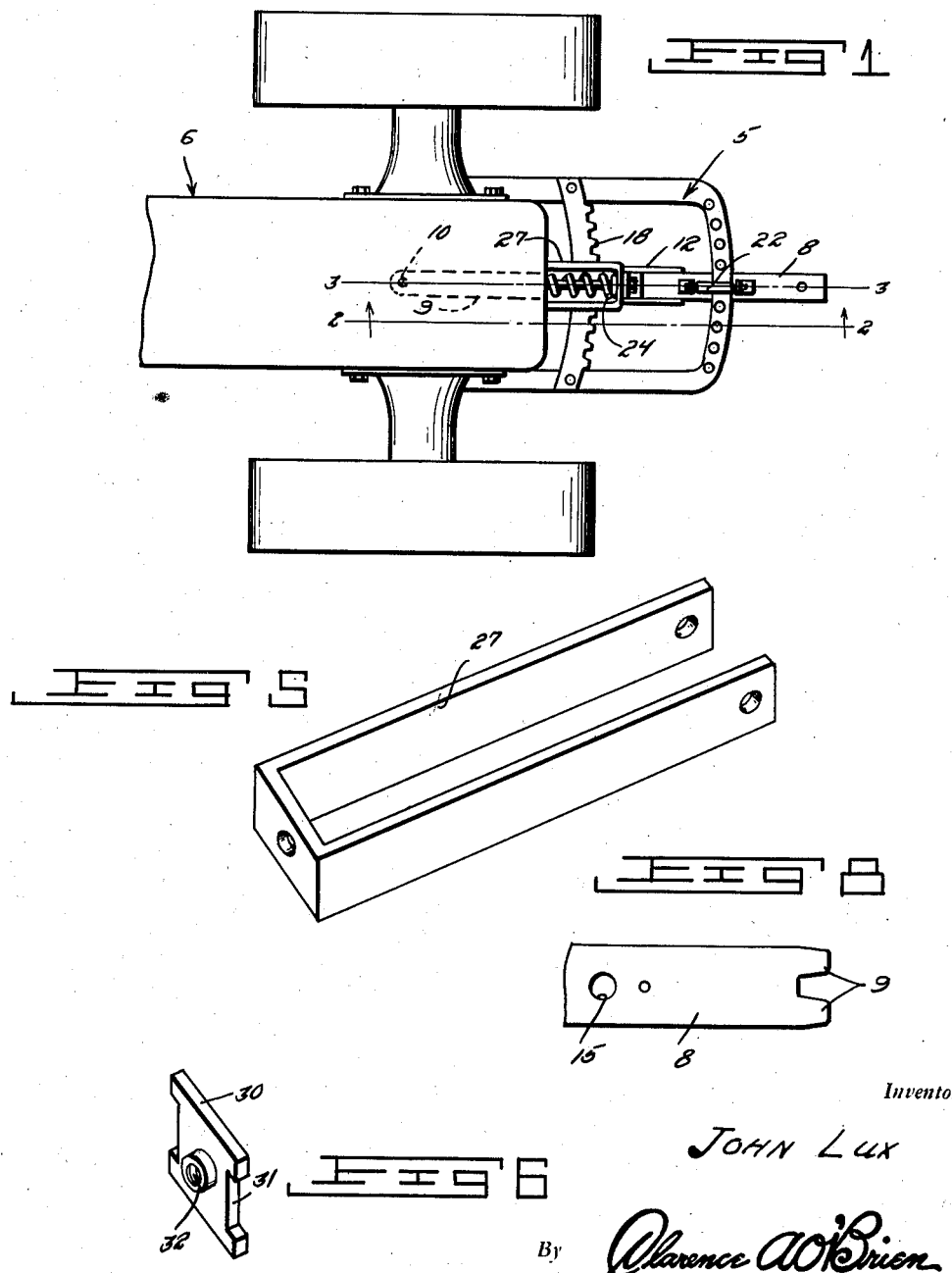
Inventor
JOHN LUX
By Clarence A. O'Brien
Attorney Feb. 17, 1942.  J. LUX  2,273,410
DRAW BAR
Filed July 11, 1941   4 Sheets-Sheet 2
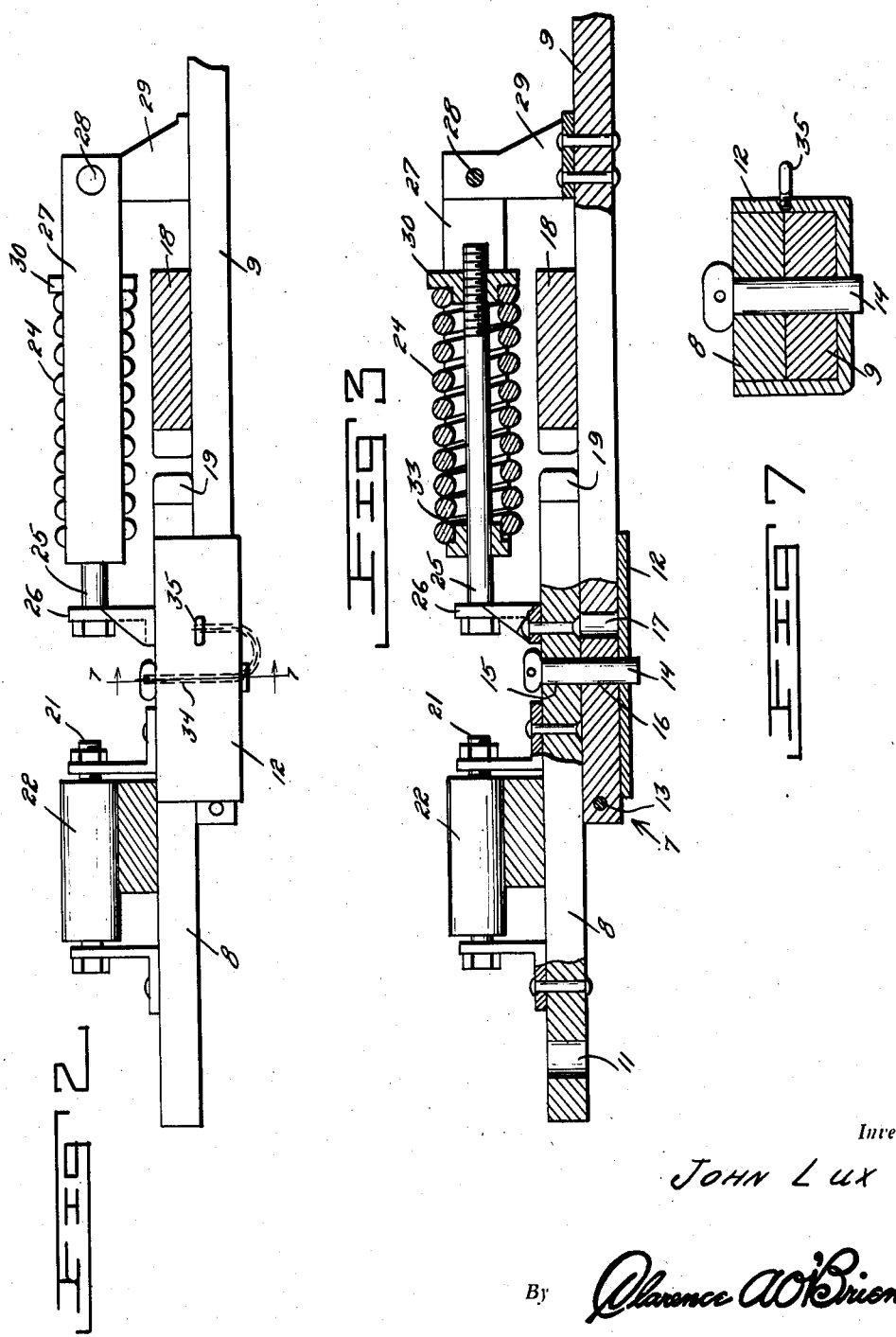
Inventor
JOHN LUX
By Clarence AO'Brien
Attorney

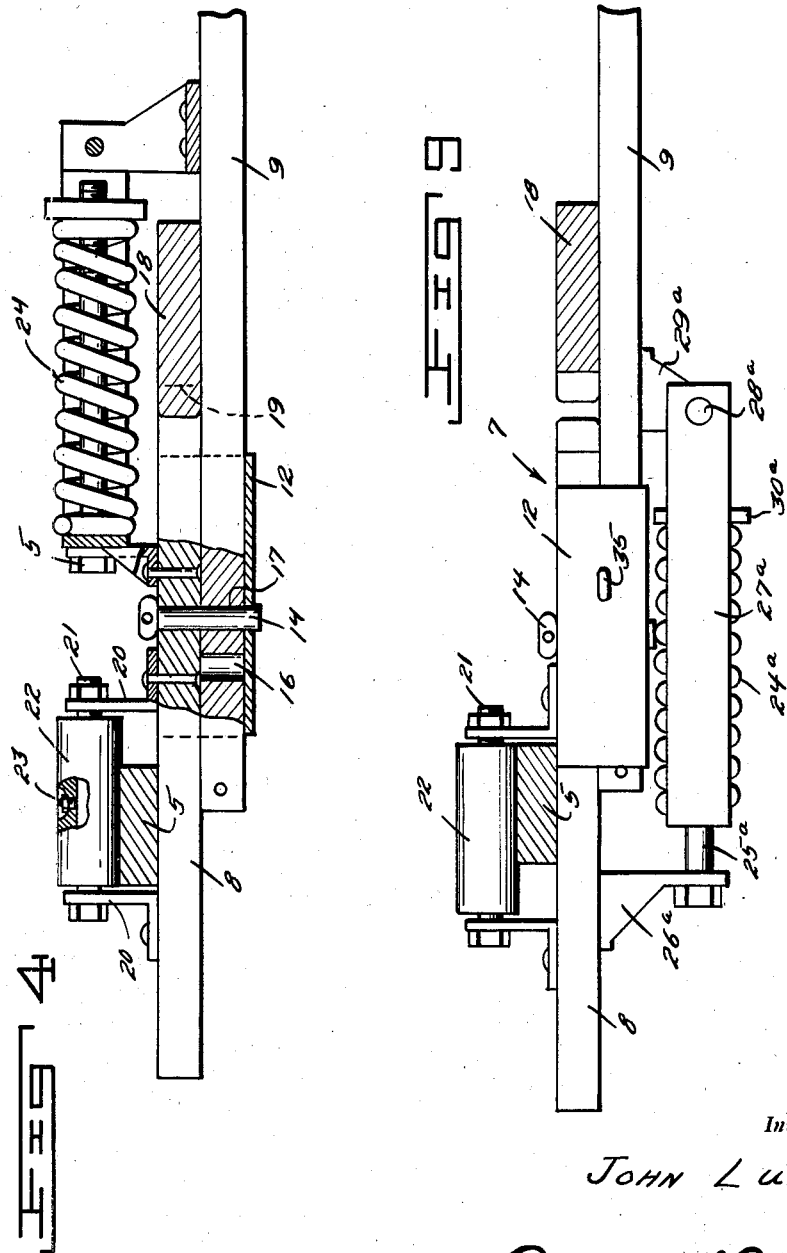

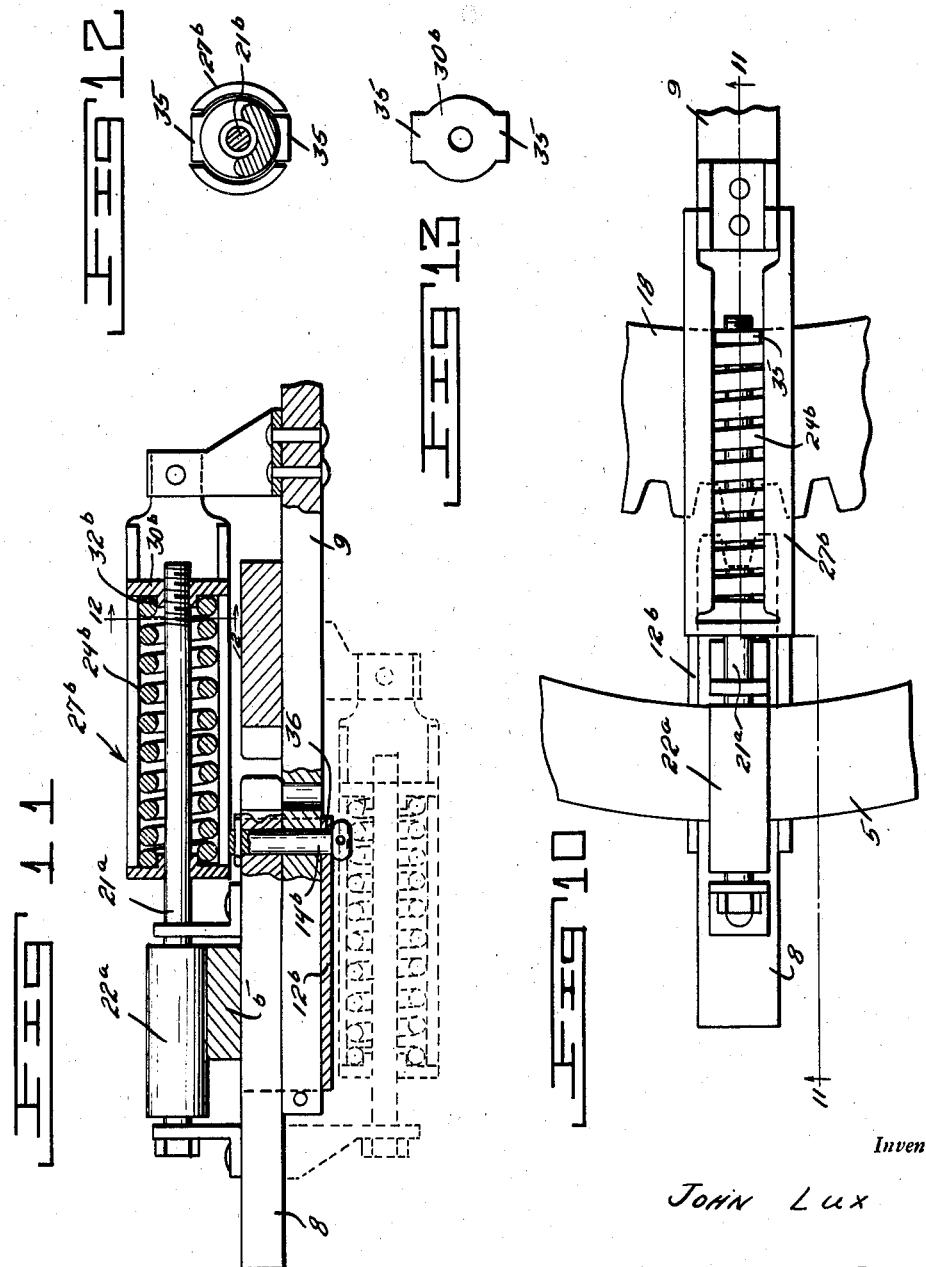

Patented Feb. 17, 1942

2,273,410

UNITED STATES PATENT OFFICE 2,273,410

DRAW BAR

John Lux, Chinook, Mont.

Application July 11, 1941, Serial No. 402,031

5 Claims. (Cl. 280—33.44)

This invention relates to tractor draw bars, and an object of the invention is to provide a draw bar of this character particularly designed for hitching agricultural and earth-working implements to a tractor, and which will automatically lock when the implement is lifted out of engagement with the ground, thus preventing buckling or pulling sidewise.

A further object of the invention is to provide a draw bar equipped to absorb shock and to materially reduce strain on the draft implement as well as on the tractor.

The invention, together with its objects and advantages, will be best understood from a study of the following description taken in connection with the accompanying drawings wherein:

Figure 1 is a plan view of a draw bar embodying the features of the present invention.

Figures 2 and 3 are detail sectional views taken substantially on the lines 2—2 and 3—3, respectively, of Figure 1.

Figure 4 is a view somewhat similar to Figure 3 but showing the draw bar locked against lateral swinging movement.

Figure 5 is a perspective view of a U-shaped member forming part of the invention.

Figure 6 is a perspective view of a slide forming part of the invention.

Figure 7 is a transverse sectional view taken substantially on the line 7—7 of Figure 2.

Figure 8 is a top plan view of the tube-equipped end of one of the sections of the sectional draw bar.

Figure 9 is a view somewhat similar to Figure 2, but illustrating a modified form of the invention.

Figure 10 is a top plan view of a draw bar showing still a third form of the invention.

Figure 11 is a detail view taken substantially on the line 11—11 of Figure 10.

Figure 12 is a detail sectional view taken substantially on the line 12—12 of Figure 11.

Figure 13 is a face view of a slide forming part of the invention shown in Figure 11.

Referring more in detail to the drawings, and particularly to Figures 1 to 4, inclusive, it will be seen that 5 indicates generally a draw bar guide which is secured to the tractor, a portion of which is shown in the drawings and indicated by the reference numeral 6, and extends rearwardly therefrom as is more or less conventional.

The improved draw bar is indicated generally by the reference numeral 7 and embodies a pair of overlapping and slidably associated sections 8 and 9.

The section 9 is pivoted at one end to the tractor at the rear thereof as indicated generally at 10 in Figure 1, and the section 9 at one end thereof is provided with an opening 11 to receive a hitch pin through the medium of which the trailer implement, such as an agricultural or similar earth-working implement is hitched to the tractor or draft vehicle 6.

The free ends of the sections 8 and 9 are arranged in overlapping sliding relation as shown, and riveted or otherwise secured to the section 9 are the sides of a channel-shaped guide 12 which receives the free end of the section 8. At said free end, the section 8 is provided with a transverse stop pin 13 which prevents the section 8 from being drawn entirely through the guide sleeve 12, as is apparent.

The sections 8 and 9 are detachably secured at either of two positions of adjustment relative to one another through the medium of a pin 14 that is adapted to be passed through an opening 15 provided in the section 9, and when the same is in registry with either of the openings 16, 17 provided in the section 8 of the draft bar.

For locking the draft bar 7 against lateral swinging movement, there is mounted on the draft bar guide 5 a longitudinally curved rack bar 18, and cooperable with the teeth of the bar 18, for the purpose mentioned, are teeth 19 on the lapping end of the draft bar section 8.

In Figure 3, I have shown the pin 14 used for securing the bar sections 8 and 9 in such a relative position as serves to maintain the teeth 19 of the bar 8 spaced from the teeth of the rack bar 18 so that the draw bar 7 is free to swing laterally in either direction.

In Figure 4, the bar sections 8 and 9 are shown secured against relative movement and with the teeth 19 of the bar section 8 in locked engagement with the teeth of the rack bar 18. In this connection it will be seen that the pin 14 is now engaged with registering openings 15 and 17.

For conducting the draw bar 7 along the arcuate end of the guide 5 and for transmitting the weight of the draw bar to the guide there are mounted on the draw bar section 8 opposed bearing brackets 20 in which are journaled the ends of an axle 21 of a roller 22. As shown, the roller 22 is provided with a suitable grease fitting 23 to maintain the roller well lubricated.

The draft section 8 is yieldably urged relative to the draft bar section 9 in a direction to releasably engage the teeth 19 of the section 8 with the rack bar 18 through the medium of a coil spring 24.

In the form of the invention shown in Figures 1 to 4, inclusive, and now being described, the spring 24 is convoluted about a tension-adjusting bolt 25 that is trained through an aperture provided in the closed end of a U-shaped member 27, the legs of which, at the open end of the U, are pivoted as at 28 to a bracket 29 secured to and rising from the draw bar section 9.

The U-shaped member 27 provides a guide for a slide member 30 that in its opposite ends is provided with notches 31 to accommodate the legs of the U-shaped guide 27.

The slide 30 is provided with a threaded boss 32 through which threads the threaded free end of the bolt 25.

The spring 24 is confined between the closed end of the guide 27 and the slide 30, and at one end seats on the boss 32, and at an opposite end seats on a boss 33 provided on the closed end of the U internally of said U-shaped guide 27 as clearly shown in Figure 3.

The expanding action of the spring 24 tends to urge the slide 30 in the direction of the bracket 29 and consequently the draw bar section 8 in a direction to engage the teeth 19 thereof with the teeth of the rack bar 18. Thus it will be seen that when the drag on the draft bar section 8 is released, as, for example, by the raising of the earth-working implement hitched thereto out of ground-engaging position, bar 8, in response to the action of spring 24 will slide relative to the bar section 9 to engage the teeth 19 of the section 8 with the rack 18 thus yieldably securing the draw bar 7 against lateral swinging movement.

As previously stated, the draft bar 7 may be positively secured against such lateral movement by engaging the pin 14 in registering openings 15 and 17.

To secure the pin 14 against loss or displacement the same is anchored through the medium of a length of chain or the like 34 and an eyebolt 35 to one side of the sleeve 12.

If desired, or necessitated by lack of space, the spring assembly 24 may be disposed at the underside of the draw bar 7, as suggested in Figure 9, wherein it will be seen that bracket 26a, bolt 25a, guide 27a, spring 24a, slide 30a, pivot 28a, and bracket 29a are all the counterparts of the corresponding spring assembly shown in Figures 1 to 4, inclusive. Consequently, a detailed description of Figure 9 is believed to be unnecessary.

Further, from desirability or expediency, a further rearrangement of the parts may be resorted as suggested in Figures 10 and 11. In this form of the invention, bracket 26 may be dispensed with and the axle 21a for the roller 22a be of material length so that the free end thereof can be used in the place and stead of the hereinbefore described bolt 25.

Thus in this third form of the invention, the axle 21a has an extended end trained through the opening provided therefor in the closed end of the U-shaped guide herein indicated by the reference numeral 27b, with the threaded free end of the axle 21a threaded through the boss 32b of the slide herein indicated by the reference numeral 30b.

Also, in this form of the invention, the sides or legs of the guide 27b are transversely curved as shown in Figure 12 to conform somewhat to to the periphery of the spring herein indicated by the reference numeral 24b, while the slide 30b is of somewhat disk form having convex edge portions that are accommodated in the concavities of the legs of the guide 27b, and integral, oppositely extending lugs 35 that are accommodated between the confronting upper and lower edges of the sides or legs of the guide 27b, as shown in Figure 12.

Also, in this form of the invention, the locking pin, indicated in Figure 11 by the reference numeral 14b, is preferably inserted upwardly through the registering openings in the draw bar sections 8 and 9; guide sleeve 12b being provided in the underside thereof with an opening 36 to accommodate the pin 14b as shown.

Also, and as suggested by broken lines in Figure 1, the spring assembly 24b may be disposed at the underside of the draft bar, and in which event, of course, the combination axle and adjusting bolt 21a will be eliminated and the usual axle 21 and bolt 25, or 25a as the case may be, substituted for the member 21a.

It is thought that the operation, adaptability, and many advantages of a draw bar of this character will be had by those skilled in the art without further detailed description.

I am also well aware that in practical fields, the details of construction, combination and arrangement of parts may necessitate alterations and therefore I do not wish to confine the invention to the precise embodiments herein illustrated other than as may be required by the prior art and scope of the appended claims.

Having thus described the invention what is claimed as new is:

1. In a draw bar, a draw-bar guide, a draw bar adapted to be pivotally mounted for lateral swinging movement relative to said guide, said draw bar embodying a pair of complemental sections having ends arranged in overlapping sliding relation, with one of the sections being movable longitudinally relative to the other section of the draw bar, an arcuate rack bar fixedly mounted on and extending transversely of said guide, and the first-named draw bar section having the end thereof lapping the second-named draw bar section provided with teeth to engage the teeth of the rack bar to secure said draw bar against lateral swinging movement relative to the guide, and interengaging means on the draw bar sections for securing said sections against longitudinal movement relative to one another, and for securing the first-named section in either a position with the teeth thereof engaged with said rack bar or in a position with the teeth thereof disengaged from said rack bar, optionally.

2. In a draw bar for tractors and the like, the combination of a relatively removable draw bar guide, a draw bar including a section pivotally mounted to swing laterally of the bar-draw guide and a second section having an end in overlapping sliding engagement with the first-named section, a rack bar secured to and extending transversely of said guide, and the second drawbar section having its lapping end provided with teeth engageable with the teeth of the rack bar for securing the draw bar against lateral swinging movement, a spring device connected with the sections of said draw bar and normally urging the second-named section of the draw bar into position to engage the teeth thereof with said rack bar, and manually manipulative interengaging means on the sections of the draw bar to secure the second-named draw bar section in either a position with the teeth thereof engaged with said rack bar or is a position with the teeth thereof disengaged from said rack bar, optionally.

3. In a draw bar, a draw-bar guide, a draw bar adapted to be pivotally mounted for lateral swinging movement relative to said guide, said draw bar embodying a pair of complemental sections having ends arranged in overlapping sliding relation, with one of the sections being movable longitudinally relative to the other section of the draw bar, an arcuate rack bar fixedly mounted on and extending transversely of said guide, and the first-named draw bar section having the end thereof lapping the second-named draw bar section provided with teeth to engage the teeth of the rack bar to secure said draw bar against lateral swinging movement relative to the guide, and interengaging means on the draw bar sections for securing said sections against longitudinal movement relative to one another, and for securing the first-named section in either a position with the teeth thereof engaged with said rack bar or in a position with the teeth thereof disengaged from said rack bar, optionally; a carrier roller mounted on the lapping draw-bar section with its periphery spaced from said draw-bar section and in travelling engagement with the free end of the draw-bar guide for movement therealong as the draw bar is moved laterally in relation to the guide.

4. In a draw bar for tractors and the like, the combination of a relatively removable draw-bar guide, a draw bar including a section pivotally mounted to swing laterally of the bar-draw guide and a second section having an end in overlapping sliding engagement with the first-named section, a rack bar secured to and extending transversely of said guide, and the second drawbar section having its lapping end provided with teeth engageable with the teeth of the rack bar for securing the draw bar against lateral swinging movement, a spring device connected with the sections of said draw bar and normally urging the second-named section of the draw bar into position to engage the teeth thereof with said rack bar, and manually manipulative interengaging means on the sections of the draw bar to secure the second-named draw-bar section in either a position with the teeth thereof engaged with said rack bar or in a position with the teeth thereof disengaged from said rack bar, optionally; and means mounted on the tooth-equipped draw-bar section in riding engagement with the draw-bar guide to move along said guide as the draw bar is moved laterally in relation to the guide and also to transmit the weight of the draw bar to said guide.

5. In a draw-bar assembly for tractors and the like, a draw-bar guide adapted to be fixedly secured to the tractor and provided with a transversely disposed rack bar, a draw bar including a section adapted to be pivotally connected to the tractor and a second section in overlapping sliding relation with the first-named section, means engaged with said sections of the draw bar serving to retain the sections against lateral swinging movement relative to one another, the second-named draw-bar section being provided at one end thereof with teeth to engage the rack bar for positively securing the draw bar against lateral movement relative to the guide, and a spring device yieldably urging the second-named draw-bar section into position engaging the teeth thereof with said rack bar, and embodying a bracket mounted on the second-named draw-bar section, a bracket mounted on the first-named draw-bar section, a U-shaped guide having the legs thereof at the open end of the guide pivoted to the second named bracket, a slide supported between the legs of said U-shaped guide, a bolt trained through aligned openings in the first-named bracket and in the closed end of said U-shaped guide and having a threaded terminal having a threaded fit through an opening provided in said slide, and a coil spring disposed about said bolt and having one end impinging on the U-shaped guide at the closed end of the U, and a second end impinging on said slide.

— JOHN LUX.